Dec. 26, 1967 T. M. LO CASALE ETAL 3,360,788

BI-DIRECTIONAL CURRENT SWITCH

Filed Dec. 14, 1964

INVENTORS
THOMAS M. LO CASALE
ALFRED E. HALES, JR.

BY William E. Cleaver

ATTORNEY

3,360,788
BI-DIRECTIONAL CURRENT SWITCH

Thomas M. Lo Casale, Warminster, and Alfred E. Hales, Jr., Philadelphia, Pa., assignors to Sperry Rand Corporation, New York, N.Y., a corporation of Delaware Filed Dec. 14, 1964, Ser. No. 418,173
6 Claims. (Cl. 340—174)

The invention described herein was made in the performance of work under NASA contracts and is subject to the provisions of the Natonal Aeronautics and Space Act of 1958, Public Law 85-568 (72 Stat. 426; 42 U.S.C. 2451), as amended.

This invention relates to bi-directional current switches, and, more particularly, to a bi-directional current switch to be used with a thin film plated wire memory.

In a non-destructive read-out memory of a word organized nature, such as a memory of the thin film plated wire type, it is very often desirable to make the number of bits in the memory word very large in order to reduce the number of word drivers and therefore to minimize the cost of the word drivers. For instance, if we consider a memory of 4,000 system words wherein each of the system words has 36 bits, then such a memory in the prior art would require 4,000 word drivers, 36 sense amplifiers and 36 bit drivers. It has become the practice that instead of having 4,000 word drivers for such a memory, the memory is organized such that for the purposes of read-out, a memory word would be considered much larger than a system word, or a word handled in a system. Throughout the description a "system word" will refer to a word as handled by the system components, i.e., registers, arithmetic unit, etc., while a "memory word" will be the number of bits driven by a word strap, and will include many system words. To continue, instead of having 4,000 memory words with 36 bits in each word, we might have 1,000 memory words with 144 bits in each word. Accordingly, we would need only 1,000 word drivers and 144 sense amplifiers as well as 144 bit drivers which in the overall would be less electronic equipment than providing 4,000 word drivers and 36 sense amplifiers as well as 36 bit drivers. While the foregoing arrangement has been an improvement over the prior art, the present invention serves to take advantage of the longer memory words, while providing simply enough equipment to selectively handle a system word.

Accordingly, it is an object of the present invention to provide an improved read-write system for a memory device.

It is a further object of the present invention to provide an improved read-write arrangement for a memory which will necessitate only enough equipment to handle a system word.

It is yet a further object of the present invention to provide a switching circuit which can be selected in accordance with a particular bit to be read out, and which can be further selected in accordance with a particular word to be read out, said switching circuit acting as a bi-directional current switch.

In accordance with a feature of the present invention there is provided a bi-directional current switch for each bit line in the memory and each bi-directional switch is selected by a bit selection pulse and a word selection pulse so that the correct bit position of the correct word is read out of or written into.

In accordance with another feature of the present invention there is provided a plurality of resistor networks one each of which is common to all of the bi-directional current switches which are assigned to the equivalent bits of each word, for instance, each bi-directional switch which is assigned to a first bit.

In accordance with another feature of the present invention each of the bi-directional switches includes two transistors of the same operation made connected together in such a manner that a signal can be transmitted across the voltage collector elements with a minimum amount of attenuation.

The above mentioned and other features and objects of the present invention will become more apparent by reference to the following description taken in conjunction with the accompanying drawings in which.

Figures 1, 2:
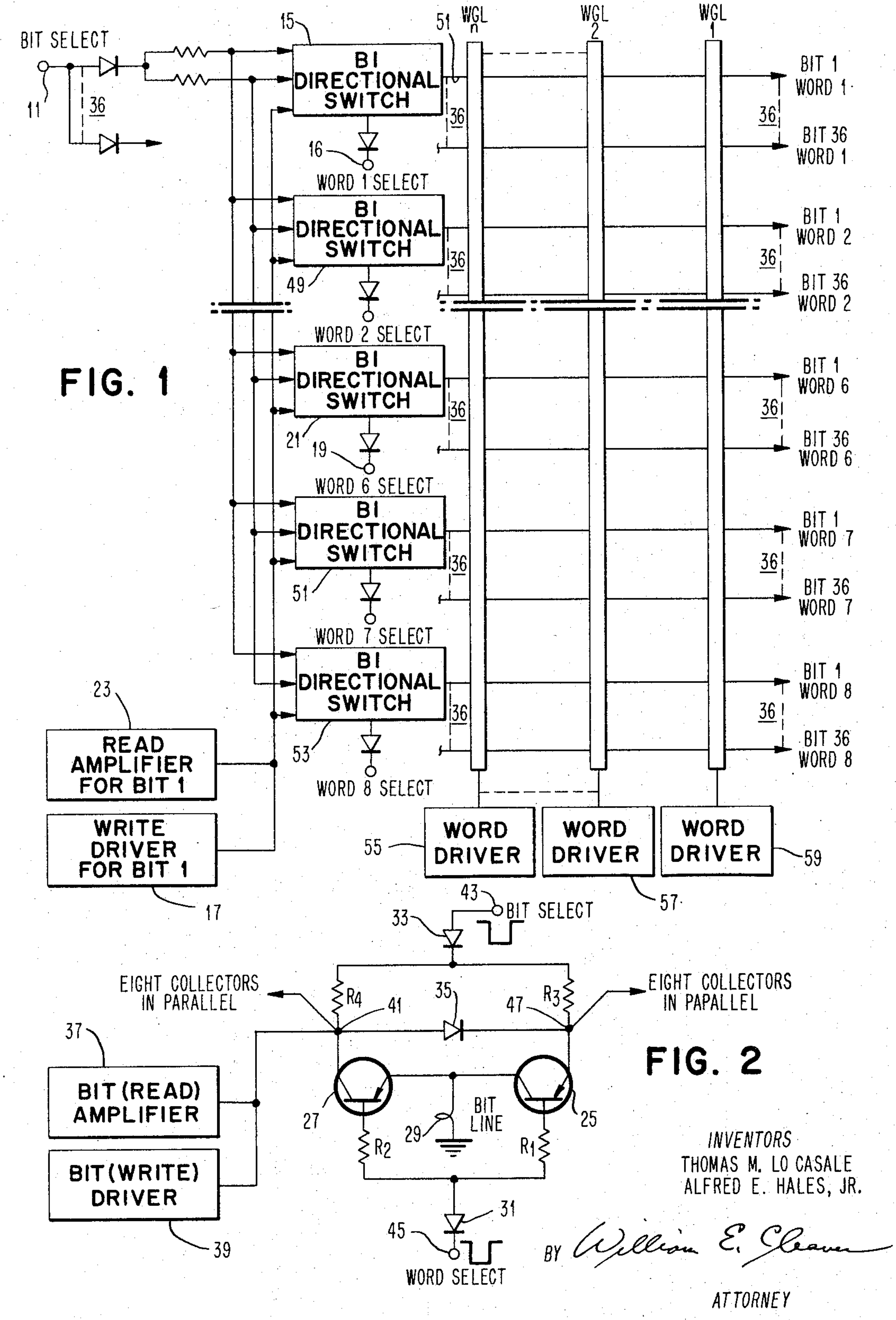
FIGURE 1 is a schematic lay out of the memory showing the relationship of the bit one lines to the present bi-directional switches.
FIGURE 2 is a schematic of the bi-directional switch of the present invention.

In general, the present invention provides a read amplifier for every bit in the system word, as well as a write driver for each bit in the system word. If we consider a 36 bit system word, then there would be 36 read amplifiers provided for this system, as well as 36 write drivers provided for this system. In addition, the present system provides a bi-directional switch for each bit in the memory word. In other words, if there are eight system words grouped together, all of which are driven by one word strap, then the number of bits influenced by this word strap would be 8×36 or 288 bits in a memory word. Accordingly, the present invention would provide 288 bi-directional switches. However, there may be as many word straps as can be conveniently, physically, accommodated in the memory, and therefore the memory is not limited to simply 288 bits, but 288 multiplied by the number of word straps. For instance, in a case where there are 100 word straps the memory would accommodate 28,800 bits.

The general operation can be readily understood from a study of FIGURE 1. In FIGURE 1 there are shown four word straps sometimes referred to as word group lines, which are identified as word group line 1, word group line 2, word group line 3, and word group line N. Schematically there is also shown a word strap driver connected to each of these word straps which serves to drive a word activating signal down the respective word straps. It should be understood that the activating signal on a word strap driver serves to rotate the magnetic vector of the thin film plated wire memory, which lies under the word strap, towards the hard axis. If there is a read operation in effect, the rotaton of a vector by the activating signal will induce signals on the bit lines, which signals can be detected by the various bi-directional switches of the bit lines and transmitted to the respective read amplifiers of the proper bits. If there is a write operation in effect, then the write driver will transmit the signal through the bi-directional signal switch down the bit line. The write signal will produce a flux that will either aid the flux of the actuating signal to rotate the vector through the 90° position of the hard axis and hence enable it to return to the easy axis in a direction 180° from which it was previously lying after the word activating signal is removed. Alternatively, the write signal will produce a flux which will oppose the activating signal flux to move the vector away from the hard axis position to which it is rotated in response to the word activating signal, and thus when this last-mentioned signal is removed, the vector will return the easy axis in the direction in which it was originally disposed.

In FIGURE 1, the bit one lines are shown and it should be understood that for each of the words there would be thirty-five additional bit lines. For purposes of illustration, the bit thirty-sixth line of the first word is also shown, and it can be ascertained by examining FIGURE 1 that there would be thirty-four additional bit lines between the bit one line of word one and bit thirty-six line of word one. The same arrangement is in effect for each of the additional seven words. In other words, between the bit one line, word two, and bit one line, word three, there are thirty-five bit lines placed, each of which crosses the word group lines one, two, three and N to define N bit storage positions per bit line. It should also be recognized at this point that the arranging of the word group lines into eight system words is quite arbitrary and a different number of system words might be chosen to make up a memory word. Obviously, the same is true for the selection of thirty-six bits to the system word, and it should be recognized that a different number of bits per system word might be used.

In FIGURE 1 if the system were activated to write into the bit one line of word one, a pulse would be applied to terminal 11 and another pulse simultaneously would be applied to terminal 13. The pulse applied to terminal 11 is a bit select pulse and it is transmitted to each of the bi-directional switches assigned to the bit one lines shown in FIGURE 1. Each of the bi-directional switches in FIGURE 1 is connected to a different bit one line of a different system word. Hence, in response to the pulse applied to terminal 11, each of the bi-directional switches of the bit ones is partially conditioned to be operative. However, as mentioned above, a second signal is applied to the terminal 13 and this signal discriminates and fully energizes bi-directional switch 15 so that the bit one line of word one receives a signal from the bit driver 17. The signal from bit driver 17, in conjunction with the proper energization of one of the word group lines one through N causes information to be written into a proper location on the bit one line of word one. Although in the preferred mode of operation only a single one of the word group lines is chosen obviously more than one word group line could be chosen so that information could be written into a number of the bit storage positions along a single bit line, for instance a number of bit positions along the bit one line of word one. By way of further illustration, if the system were to experience a read-out from the bit one line of word six a signal would be applied to terminal 11, and simultaneously to the terminal 19, which would serve to energize the bi-directional switch 21. At the same time a signal induced in the bit one line of word six by the energization of a selected one of the word group lines one through N would cause a signal to be transmitted to the bi-directional switch and ultimately to be detected by the read amplifier 23.

It must be emphasized that FIGURE 1 is only a limited schematic and it should be understood that there is a similar arrangement for each of the bit lines in each of the words. Hence, there will be thirty six read amplifiers similar to read amplifier 23, and thirty six write drivers similar to write driver 17. Each read amplifier will be paired with an associated write deliver and these two electronic components will be coupled in parallel to an assigned eight bi-directional switches. If the associated read amplifier and write driver happens to be assigned to bit twenty four, then each of the assigned bi-directional switches will be connected to the bit 24 line of a different word.

Examine now in detail the operation of the circuitry of the bi-directional switch by studying FIGURE 2. In FIGURE 2 there is shown a pair of transistors 25 and 27. Each of the transistors 25 and 27 is a PNP transistor but by the proper selection of voltages these transistors might be NPN transistors.

As can be seen in FIGURE 2 the bit line 29 is common-connected to the collector of transistor 25 and to the emitter of transistor 27. The bit line 29 is the same type of line as bit one line word one of FIGURE 1, and therefore the point 51 in FIGURE 1 at which bit one line of word one connects to the bi-directional switch 15 is the common connection between the emitter of one transistor of the bi-directional switch 15 and the collector of a second transistor of bi-directional switch 15.

Returning to FIGURE 2 we find that the base of transistor 25 and the base of transistor 27 are connected through two resistors R1 and R2 to a diode 31. The resistors R1 and R2 are of identical value. Further in FIGURE 2 it is evident that the emitter of transistor 25 is connected through a resistor R3 to the diode 33 while the collector of transistor 27 is connected through resistor R4 to the diode 33. Connected between these last-mentioned circuits is the diode 35. Although the values are not shown, resistor R3 equals resistor R4, each of which equals resistors R1 and R2.

Finally, as is evident in FIGURE 2, there is a read amplifier 37 and a bit write driver 39 which are common-connected to the point 41. The point 41 is the common-connection between the collector of transistor 27, the anode of diode 35, and the lower terminal of the resistor R4.

At the time that the bit line 29 is to be selected there is a positive pulse applied to the upper terminal 43. This positive pulse is analogous to the pulse that was applied to terminal 11 in FIGURE 1. Simultaneously, there is a negative pulse applied to the terminal 45 and the application of this negative pulse is analogous to the application of a pulse to either terminals 13 or 19 as described with respect to FIGURE 1.

In response to the positive pulse being applied to terminal 43 at the same time that a negative pulse is applied to terminal 45 there is current flow from terminal 43 through diode 33, through the resistor R3, through the emitter of transistor 25 out of the base of transistor 25 through the resistor R1, through the diode 31 to the terminal 45. By proper selection of the resistors R1, R2, R3 and R4 (i.e., making them equal) and the proper selection of the reference voltage of bit line 29, the amount of current applied to the emitter of transistor 25 is conducted from the base of transistor 25 and hence there is no current flow through the collector of transistor 25 to the bit line 29. At the same time there is current flow from the terminal 43 through the diode 33 to the resistor R4 through the collector of transistor 27 from the base of transistor 27, through the resistor R2 through the diode 31 to terminal 45. As mentioned above by the selection of the resistors R4 and R2 the current which is applied to the collector transistor 27 is transmitted from the base thereof, and hence no current flows in the emitter of transistor 27. Because the resistors R1, R2, R3 and R4 are equal, there is no difference of potential between point 41 and 47; hence, there is no current flow through the diode 35.

When the switch has been selected as just described and there is to be a write-in operation accomplished, the bit driver 39 will transmit the pulse to the terminal 41. If the pulse arriving at terminal 41 is positive, current will be transmitted through the diode 35, through the transistor 25, and through the bit line 29. The transistor 27 represents a high impedance to this current pulse and therefore normally no current will flow through the transistor 27, i.e., from the emitter thereof to the bit line 29; however, in the event current does flow from the emitter of transistor 27 this current is delivered to the bit line 29 whereat it aids the current passing through the transistor 25.

The current flowing from the collector of transistor 25 is the bit current which provides the additional flux to rotate the magnetic vector (or vectors) along the bit line through the 90° position of the hard axis, or away therefrom depending upon what is to be stored in these positions. If the pulse applied to terminal 41 is negative, current will conduct from ground, through the bit line 29, through the transistor 27, to effect the delivery of a current pulse to a bit driver 39. Actually, the current supplied from ground to the bit line is transmitted through the emitter of transistor 27 and out the base thereof, but since the current in the base of transistor 27 is a constant current, the current to bit driver 39 is supplied from point 41 to effect a write-in condition.

If a read out is to be effected, there will be either a positive or a negative voltage condition induced on the bit line 29. If a negative voltage is induced on the bit line 29 current will conduct from the read amplifier 37 through transistor 27 to bit line 29. If the induced negative signal is large enough current will flow through diode 35 and through transistor 25 in addition to flowing through transistor 27. On the other hand, if a positive voltage is induced on the bit line 29, this signal will be transmitted to the read amplifier through the transistor 27 which appears as a low impedance to a positive signal induced on the bit line.

For better understanding of the foregoing transistor operation it should be understood that a transistor which is conducting in deep saturation no longer behaves with what is normally considered transducer action, but instead behaves as a resistor, $R_S$, called saturation resistance. It is well known that $V_{ce}=V_t \ln \frac{1}{2_f}$. Where $V_{ce}$ is the voltage between the collector and the emitter of the transistor: $V_t$ is the constant for semiconductor material and $2_f$ is the alpha characteristic of a transistor in a forward direction. It is also well known that $V_c=V_t \ln \frac{1}{2_f} \pm V_{\text{bit line}}$, where $V_c$ equals the voltage at the collector. Now if we take some normal values and consider them in the foregoing equations, for instance $V_t$ is equal to 26 mv. at room temperature and $2_f$ equals 0.98 for beta equal to 50, then we find that:

$$V_c=V_t \ln \frac{1}{0.98}=(26 \text{ mv.})(0.02)=.5 \text{ mv.}$$

Since the V bit line for a read-out operation is greater than .5 mv., we find that the offset voltage $V_c$ can be considered negligible.

One of the significant advantages of the present invention is the fact that the same type transistor may be used and there need be no matching problems involved. The circuitry can be considered as composed of "off shelf" components which of course lends itself to an economical and therefore desirable design.

While we have described above the principles of our invention and in connection with specific apparatus, it is to be clearly understood that this description is made only by way of example and not as a limitation of the scope of our invention, as set forth in the objects thereof and in the accompanying claims.

The embodiments of the invention in which an exclusive property or privilege is claimed are defined as follows:

1. A bi-directional current switch comprising:

(a) first and second transistors of the same conductive type each having an emitter element, a base element, and a collector element;

(b) a diode connected between the emitter element of said first transistor and the collector element of said second transistor;

(c) the emitter element of said second transistor connected to the collector element of said first transistor, said last-mentioned elements being common-connected to a load means;

(d) first and second pulse source means;

(e) a first resistor network coupled to said first pulse source means and across said diode;

(f) a second resistor network coupled to said second pulse source means and to said base elements of said first and said second transistors, said first and second resistor networks having resistors whose values are such that when said first and second pulse source means simultaneously apply pulses respectively to said first and second resistor networks said first and second transistors are rendered conducting in saturation such that the current conducting through said first resistor network is conducted in its entirety through said second resistor network; and (g) input signal means connected to said first resistor network to supply signals alternatively and on occasion collectively through said first and second transistors to said load means and to receive signals in the same manner from said load means through said first and second transistors.

2. A bi-directional current switch device to be used with a thin plated wire memory comprising:

(a) first and second transistors each having an emitter element, a base element, and a collector element;

(b) a diode connected between the emitter element of said first transistor and the collector element of said second transistor;

(c) the emitter element of said second transistor connected to the collector element of said first transistor, said last-mentioned elements being common-collected to a thin film plated wire memory;

(d) first and second pulse generating means;

(e) a first resistor network coupled to said first pulse generating means and across said diode, said first resistor network adapted to be connected across a plurality of diodes similar to said diode;

(f) second resistor network means coupled to said second pulse generating means and connected to the base elements of said first and second transistors, said first and second resistor networks having resistors whose values are such that when said first and second pulse generating means simultaneously apply signals to said first and second resistor networks, said first and second transistors are rendered conducting in saturation in such a manner that the current conducting to said first resistor network conducts in its entirety to said second resistor network; and (g) input signal means connected to said first resistor network to supply signals alternatively and on occasion collectively through said first and second transistors to said thin film plated wire memory and receive signals in the same manner from said thin film plated wire memory through said first and second transistors.

3. A read amplifier and bit driver switching network to be used with a thin film plated wire memory which has a plurality of bit lines and wherein the bits defined on such lines are divided into system words, a group of which make up a memory word comprising:

(a) a plurality of bi-directional switches, each one of which is assigned to a different one of the bit lines in said thin film plated wire memory;

(b) each of said bi-directional switches comprising first and second transistors, each having an emitter element, a base element, and a collector element;

(c) each of said bi-directional switches further including a diode connected between the emitter element of said first transistor and the collector element of said second transistor;

(d) each of said bi-directional switches further including circuitry means connecting the emitter element of said second transistor to the collector element of said first transistor, said last-mentioned circuitry means being further connected to the bit line to which the bi-directional switch is assigned;

(e) a plurality of first pulse generating means and a plurality of second pulse generating means;

(f) a plurality of first resistor networks each of which is assigned to a different bit of a system word handled by said thin film plated wire memory, each of said first resistor networks connected in parallel across a different plurality of diodes of the bi-directional switches, the plurality of diodes connected to any particular first resistor network being the diodes of the respective bi-directional switches assigned to the particular bit lines which define the particular bit to which first resistor network is assigned;

(g) a plurality of second resistor networks each of which is included in a different one of said bi-directional switches and each of which is connected across the base elements of the transistors in the bi-directional switch to which it is assigned, each of said second resistor networks further connected to a different one of said plurality of second pulse generating means;

(h) a plurality of read amplifiers and a plurality of bit drivers with one read amplifier and one bit driver assigned to each bit of a system word, the read amplifier and the bit driver assigned to any particular bit being common-connected to each other and further connected to the bi-directional switch in said memory which is assigned to said designated bit, said read amplifier operating to receive signals from a particular one of said bit lines through the assigned bi-directional switch thereof and said write driver operating to transmit signals to said particular bit line through the assigned bi-directional switch thereof.

4. A thin film plated wire memory comprising:

(a) $x$ bit lines for storing information bits, said bit lines considered as divided into $y$ groups of $n$ bit lines;

(b) $z$ word straps each of which makes one intersection with every one of said bit lines, thereby defining $x$ bits per word strap as representing a memory word and defining a $y$ number of system words each having $n$ bits for each word strap;

(c) $x$ bi-directional current switches each of which is assigned for connection to a different one of said $x$ bit lines;

(d) $n$ resistor networks each assigned to a different bit of a system word, each of said resistor networks connected in parallel to $y$ bi-directional switches, wherein each of said last-mentioned bi-directional switches is connected to the equivalent bit of each of the $y$ system words;

(e) $n$ first pulse sources each of which is connected to a one of said resistor networks;

(f) $x$ second pulse sources each of which is connected to a different one of said bi-directional switches, said memory operating such that when one of said second pulse sources is energized, it selects one of said $y$ system words and when one of said first pulse sources is energized it selects one of the $n$ bits in said last-mentioned $y$ word for effecting a read out of information and alternatively for effecting a write-in of information;

(g) $n$ read amplifiers and $n$ bit drivers, each of said read amplifiers common connected to a different one of said bit drivers with said common connection further connected to a different one of said resistor networks.

5. A thin film plated wire memory according to claim 4 wherein each of said bi-directional current switches includes:

(a) first and second transistors of the same conductive type each having an emitter element, a base element, and a collector element;

(b) a diode connected between the emitter element of said first transistor and the collector element of said second transistor;

(c) said emitter element of said second transistor connected to the collector element of said first transistor, said last-mentioned elements being common-connected to said assigned one of said $x$ bit lines.

6. A bi-directional current switch comprising:

(a) first and second transistors of a same conductive type each having an emitter element, a base element, and a collector element;

(b) uni-directional current conducting means connected between the emitter element of said first transistor and the collector element of said second transistor;

(c) the emitter element of said second transistor connected to the collector element of said first transistor, said last-mentioned elements being common-connected to a load means;

(d) first and second pulse source means;

(e) a first resistor network coupled to said first pulse source means and across said unidirectional conducting means;

(f) second resistor network means coupled to said second pulse source means and to said base elements of said first and second transistors, said first and second resistor networks having resistors whose values are such that when said first and second pulse source means simultaneously apply pulses respectively to first and second resistor networks said first and second transistors are rendered conducting in saturation such that current conducting through said first resistor network is conducted in its entirety through said second resistor network;

(g) means connected to said first resistor network which are adapted to be connected to receive input signals to supply signals alternatively and on occasion collectively through said first and second transistors to said load means.

References Cited

UNITED STATES PATENTS

| | | | |
|---|---|---|---|
| 2,962,699 | 11/1960 | Endres | 340—174 |
| 2,993,198 | 7/1961 | Barnes et al. | 340—174 |
| 2,997,600 | 8/1961 | Hilberg et al. | 307—88.5 |
| 3,025,411 | 3/1962 | Rumble | 307—88.5 |
| 3,119,025 | 1/1924 | Lourie et al. | 307—88 |
| 3,129,411 | 4/1964 | Albrecht | 340—174 |
| 3,165,642 | 1/1965 | Noll | 307—88.5 |
| 3,192,510 | 6/1965 | Flaherty | 340—174 |
| 3,195,114 | 7/1965 | Gunderson et al. | 340—174 |
| 3,208,053 | 9/1965 | Elovic | 340—174 |
| 3,210,741 | 10/1965 | Cohler et al. | 340—174 |
| 3,231,753 | 1/1966 | Brown | 307—88.5 |
| 3,273,126 | 9/1966 | Owen et al. | 340—174 |

BERNARD KONICK, *Primary Examiner.*

S. URYNOWICZ, *Assistant Examiner.*